Jan. 18, 1944.  W. S. JAMES  2,339,269
TRANSMISSION
Filed March 7, 1942  2 Sheets-Sheet 2

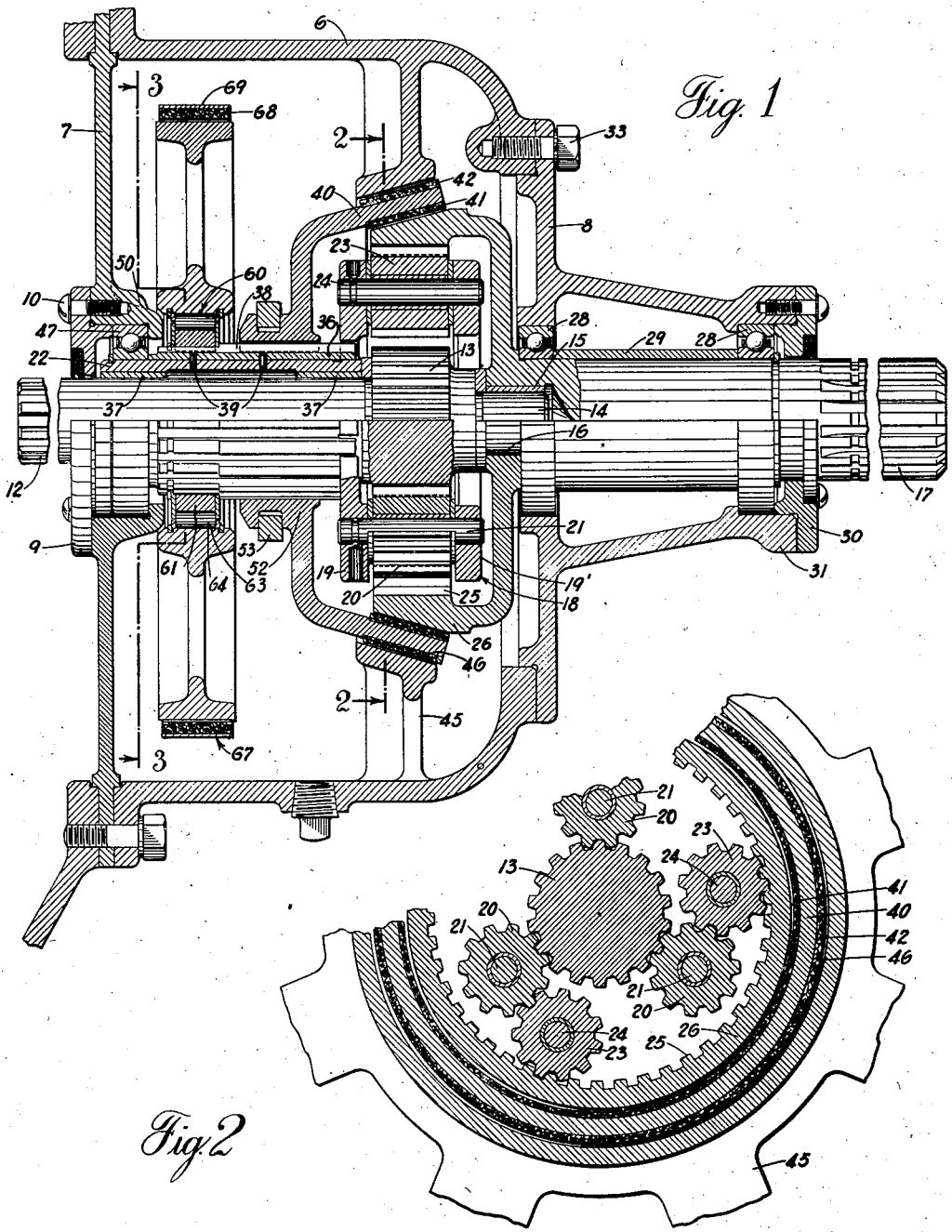

INVENTOR
William S. James
BY Brown, Jackson, Buttetu. Dieues
ATTORNEYS

Patented Jan. 18, 1944

2,339,269

UNITED STATES PATENT OFFICE 2,339,269

TRANSMISSION

William S. James, South Bend, Ind., assignor to The Studebaker Corporation, South Bend, Ind., a corporation of Delaware Application March 7, 1942, Serial No. 433,817

6 Claims. (Cl. 74—289)

My present invention relates to a transmission and more particularly to a two speed transmission comprising an epicyclic gear mechanism.

My transmission is adapted for use in instances where two speeds in either direction of a driven shaft are desirable. The transmission is adaptable for use in connection with airplane propellers, or in combination with additional change speed mechanism to provide a greater number of speed ratios, such as required in automotive vehicles and the like. The transmission of my invention is adapted to be connected either fore or aft of present known forms of gear boxes for the last noted purpose.

Present epicyclic gear mechanisms with which I am familiar comprise means for locking the planetary gear system as a unit for direct drive or for locking one of the elements of the gear system against rotation to effect ratio drive. Certain of these known forms of planetary gear systems comprise overrunning or free wheeling clutch means which are effective to cause continuous application of torque from the drive shaft to the driven shaft during a change of gear ratio through the planetary gear system. Change of gear ratio in known forms of epicyclic gear mechanisms is attained by providing a torque transmitting member which is operative to clutch one of the elements, such as the ring gear, to a second element, such as the planet carrier, to effect direct drive or for locking one of the elements, such as the planet carrier, to effect ratio drive through the system. These known forms of torque transmitting members generally pass through a neutral position wherein no torque is caused to be transmitted by it to the driven shaft. It has been previously proposed to incorporate an overrunning brake effective to cause continuous application of torque to the driven shaft during shifting of the aforementioned torque member when the latter is disposed in its neutral position. The overrunning brake is so arranged that it overruns when the drive shaft and driven shaft are coupled together for direct drive through the planetary gear system. However, so far as I am aware, the overrunning brakes of the prior art are not capable of being rendered inoperative, selectively, so that when the torque transmitting member of the epicyclic gear mechanism is disposed in neutral position no torque is transmitted to the driven shaft. Furthermore, the arrangement of the epicyclic mechanism and overrunning brake has been such that reverse drive cannot be imparted to the driven shaft.

It is an object of my invention to provide an epicyclic gear mechanism of the character described comprising overrunning or one-way brake means effective to transmit torque to the driven shaft when the torque transmitting member is disposed in a neutral position, and selectively operable means for rendering the overrunning or one-way brake inoperative to discontinue the application of torque to the driven shaft when the torque member is disposed in its neutral position.

A further object is to provide an epicyclic gear mechanism of the character indicated wherein two forward and two reverse speeds are attainable and characterized by the provision of means for enabling continuous application of torque in changing the speed ratio between the two speeds in one direction of rotation of the driven shaft.

A further object is the provision of novel means for establishing a neutral position in which no torque is transmitted to the driven shaft, and in which the means referred to are adaptable for progressively applying torque from the drive shaft to the driven shaft.

In order to attain the above object I propose to provide an epicyclic gear system comprising a sun gear, a ring gear and a planet carrier having planet pinions. Preferably, the planet carrier comprises dual planet pinions arranged so that certain of said pinions have meshing engagement with the sun gear, and other of said planet pinions have meshing engagement with the first planet pinions and the ring gear. Preferably, the sun gear is formed integrally with the drive shaft and the ring gear is suitably secured or formed integrally with the driven shaft. Torque transmitting means having a neutral position and comprising a torque transmitting member, preferably keyed to the planet carrier, is provided for clutching the ring gear to the planet carrier to effect a direct drive from the drive shaft to the driven shaft, or to lock the planet carrier against rotation so that ratio drive, and in the present instance underdrive, is transmitted to the driven shaft through the epicyclic mechanism, selectively.

Also, an overrunning brake means is incorporated in the transmission and is arranged so that upon shifting of the torque transmitting member to change from direct drive to ratio drive, or vice versa, there is a continuous application of torque from the drive shaft to the driven shaft in one direction of rotation of the drive shaft. Suitable additional brake means is associated with the overrunning brake and is selectively operable to render the overrunning brake inoperative. When the additional brake means referred to is released the overrunning brake is rendered inoperative and torque will not be transmitted from the drive shaft to the driven shaft when the torque transmitting means is in neutral, or during shifting of the torque transmitting member to effect direct drive to ratio drive, or vice versa. The present mechanism with the provision of suitable reverse gearing is also adaptable for imparting drive to the driven shaft in the reverse direction and this drive may be either a direct drive or ratio drive, depending upon the position of the torque transmitting member. The reverse gearing is not herein disclosed since such gearing is well known. When reverse drive is to be imparted to the driven shaft the brake means for the overrunning brake is released. When reverse drive is imparted to the drive shaft and a change of gear ratio is effected by shifting of the torque transmitting member there will be an interruption in the application of torque to the driven shaft.

A feature of my invention comprises the provision of a dual planet pinion carrier in a transmission of the character referred to and arranged with respect to the overrunning brake so that when the latter is in its operative position the planet carrier is effective to cause the overrunning brake to lock up upon shifting of the torque transmitting member or positioning the latter in its neutral position. Thus, the application of torque to the driven shaft is not interrupted when the driven shaft is being driven in a forward direction by the source of power to which it is connected.

A further feature of my invention resides in the provision of brake means for the overrunning brake which together with the torque transmitting means may be utilized as a master control clutch for the transmission herein disclosed or the combination of the latter with other gear mechanisms. It will be understood that the drive shaft may be connected to one part of a fluid coupling which is connected to a source of power or otherwise connected or geared to the prime mover.

A still further feature resides in the provision of brake means for the overrunning brake and the provision of a torque transmitting member both of which are operatively associated with the planet pinion carrier so that, in effect, a dual clutch and brake means is provided. These two means may be operable simultaneously or in sequence to progressively effect application of torque from the drive shaft to the driven shaft. The brake means for the overrunning brake is adapted to be rendered inoperative and the torque transmitting member may be disposed in neutral position to enable easy starting of the prime mover for the drive shaft.

In the operation of the transmission of my invention it is preferable in effecting ratio drive to first lock the planet pinion carrier against rotation by means of the torque transmitting member and subsequently applying the brake means associated with the overrunning brake for rendering the latter operative. In this use of the device the torque transmitting member functions principally to prevent free wheeling through the transmission.

It will be obvious that the transmission of my invention is admirably suited for use with a dual speed supercharger for internal combustion engines. If desired, one or more of the transmissions of my invention may be arranged so that several speed ratios are obtainable.

The above noted objects and features of my invention will more clearly appear from the following description and, in addition, other objects and advantages will appear.

Now in order to acquaint those skilled in the art with the manner of constructing and operating a transmission of the character contemplated by my invention, I shall describe in connection with the accompanying drawings a preferred embodiment of the same.

In the drawings:

Figure 1 is a vertical sectional view of a transmission constructed in accordance with my invention, certain parts being shown in elevation;

Figure 2 is a detail vertical sectional view taken substantially on line 2—2 of Figure 1 and looking in the direction indicated by the arrows;

Figure 3:
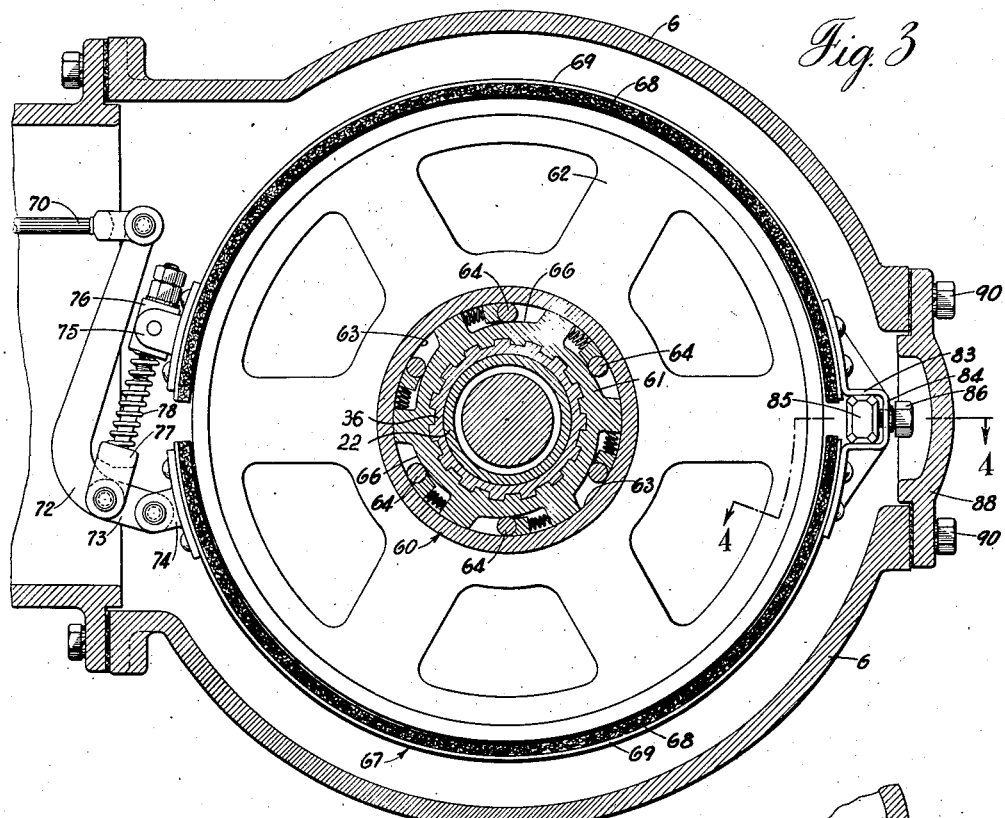
Figure 3 is a vertical sectional view taken substantially on line 3—3 of Figure 1 looking in the direction indicated by the arrows.

Referring now to Figures 1 through 3, I have shown a transmission casing 6 provided with end closure plates 7 and 8 and in which casing the mechanism of my invention is adapted to be arranged. It will be understood that this housing is of a known character and may vary widely in its design. An annular bearing retainer plate 9 is secured substantially centrally of the end wall 7 by means of a plurality of screws 10. A drive shaft 12 extends through an aperture formed in the end plate 9 and has formed on its inner end a sun gear 13. The sun gear 13 is preferably formed integrally with the drive shaft but this is not essential and may be formed otherwise, if desired. The end of the drive shaft is provided with a reduced end 14 which is suitably journalled in a bearing 15 disposed within the recess 16 in one end of a driven shaft 17. The other end of the driven shaft is suitably splined for connection to the mechanism to which it is desired to impart drive. It will be understood that the drive shaft 12 may be connected to the driven element of a fluid coupling which, in turn, is connected to a prime mover, or the drive shaft 12 may be connected to a suitable power source in any other desired manner. A planet carrier generally indicated at 18 comprises an annular sleeve 22 having an annular plate member 19 which together with a spaced second spider plate 19' are adapted to support therebetween a plurality of planet pinions 20 rotatably mounted about the shafts 21 which extend between the spider members 19 and 19'. The shafts 21 are provided with customary journal sleeves and thrust washers as shown in the drawings.

The first set of planet pinions 20 mesh with the sun gear 13. A second set or plurality of planet pinions 23 are mounted for rotation about the shafts 24 which extend between the spider plates 19 and 19' in the same manner as the shafts 21 above described. The planet pinions 23 have meshing engagement with the planet pinions 20 and the internal teeth 25 of a ring gear 26. It will thus be observed that the planet carrier comprises dual planet pinions.

The ring gear 26 preferably is formed integrally with the driven shaft 17 but this is not essential since, if desired, the ring gear could be formed as a separate member and be splined or otherwise keyed to the driven shaft. The end member 8 is provided with a pair of ball bearing assemblies 28 for rotatably supporting the driven shaft. Preferably, a spacer sleeve 29 extends between the ball bearing assemblies and an end plate 30 having an opening through which the driven shaft extends is suitably secured to a hub portion 31 formed integrally with the end plate 8. The end member 8 is adapted to be secured to the casing by a plurality of screws 33.

Referring again to the planet pinion carrier 18, it will be seen that the annular sleeve portion extends coaxially of the drive shaft 12 and is suitably journalled thereon by means of the bushings 37. The splined sleeve 22 is secured to the hub 36 by means of a plurality of pins 39. Further, the spider 19 is provided with a plurality of suitable recesses receiving the high portions of the inner ends of the splines of the sleeve 22 to effectively couple the sleeve 22 to the planet pinion carrier 18.

A torque transmitting member 40 is provided with conical internal and external annular friction surfaces 41 and 42, respectively. The ring gear 26 is provided with an external conical friction surface adapted to be engaged by the internal conical surface 41 of the torque transmitting member 40. The housing 6 has preferably formed integrally therewith an annular rib 45 having a conical friction surface 46 adapted to be engaged by friction material 42 of the torque transmitting member 40. It will be observed that the several friction surfaces described all extend in the same general direction and are arranged in overlapping relation. A ball bearing race assembly 47 is suitably arranged between the annular bearing retainer plate 9, a hub or boss portion 50 of the end plate 7 is formed substantially centrally of the latter, and the external surface of the hub portion 22 of the planet pinion carrier. The torque transmitting member 40 is provided with a hub portion 52 which is splined to the sleeve 22 and is shiftable axially thereon upon manipulation of a shifter fork 53. The shifter fork 53 may be shifted automatically or manually, as desired.

In the structure so far described it will be seen that if the shifter fork 53 is shifted to the left as viewed in the drawings, the friction material 42 will engage the annular friction surface 46 of the web 45 so that the planet pinion carrier 18 is held against rotation. With the parts in this position the driven shaft 17 will be rotated at a slower speed, or underdrive, than the drive shaft 12 in that the drive from the shaft 12 will be imparted to the first set of planet pinions 20 to the second set of planet pinions 23 and thence to the ring gear 26 which, in the embodiment shown, is formed integrally with the driven shaft. When the torque transmitting member 40 is shifted to the right the friction surface 41 will engage the annular friction surface of the ring gear 26 and the drive and driven shafts will rotate together.

An overrunning or one-way brake means indicated generally at 60 comprises a cam member 61 which is splined to the sleeve 22 for rotation therewith. A brake drum 62 comprising a hub having an internal annular surface 63 and a plurality of spring-loaded roller members 64 are disposed between the cam member 61 and the internal surface 63 of the hub of the brake drum. The cam surfaces 66 are arranged so that the overrunning brake is locked up upon imposition of a force acting in a counterclockwise direction upon the planet pinion carrier 22. A brake means generally indicated at 67 comprising a pair of arcuate brake bands 69 lined with brake lining material 68 is adapted to be operated selectively to contact the external annular surface of the brake drum to hold the same against rotation and render the overrunning brake means operative, or released to render the overrunning brake inoperative.

Any suitable mechanism for operating the brake means 67 may be provided and in the embodiment shown comprises an actuating member 70 which is connected to a diaphragm 71 controlled by vacuum. One end of the member 70 is pivotally secured to the free end of a bell crank lever 72, the shorter arm 73 of which is pivotally mounted in a clevis 74 fixed to the lower arcuate external brake band. A clevis 75 is secured to the upper arcuate external brake band and pivotally supports a trunnion 76, a spring loaded link member 77 having a clevis at one end which is pivotally mounted at the leverage position of the bell crank lever, and a coil spring 78 disposed about the link member 77 and seated between the clevis end of the link 77 adjacent the bell crank lever and the opposite end against the trunnion 76. The spring tends to normally space the brake lining 68, carried by the brake bands, away from the brake drum so that normally the brake is off.

The diaphragm is secured between annular flanges 79 of a pair of cup-shaped members which form a chamber in which the diaphragm is disposed. A suitable vacuum source is connected in any suitable manner to the diaphragm housing for imparting translational movement to the rod 70. Any suitable connection may be provided between the end of the rod 70 and the diaphragm and, as shown, comprises packing elements for preventing leakage and spring cushioning means for holding the diaphragm and to provide a seal for the same.

The opposite ends of each of the arcuate brake members 69 are secured to a clamp 83 which is provided with a U-shaped portion 84 into which one end of an anchor 85 extends and is adapted to be secured by a screw 86. The other end of the anchor 85 is serrated and fits in a recess provided therefor in the housing 6.

Figures 4, 5:
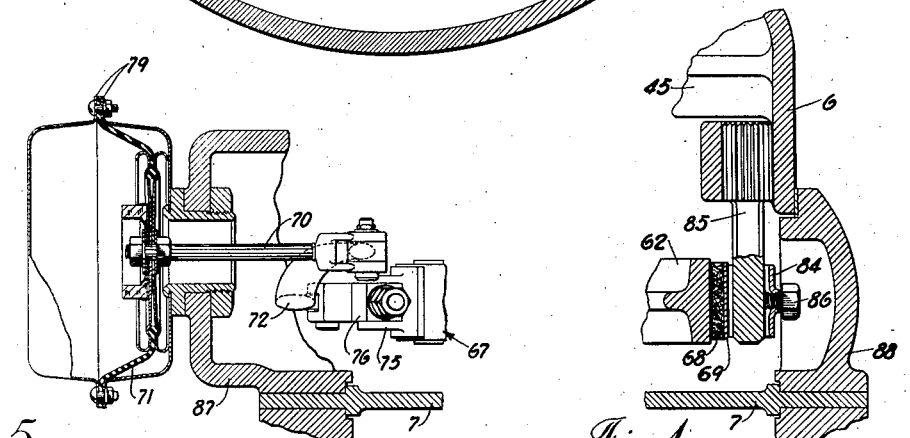
Figure 4 is a substantially horizontal sectional view taken on the line 4—4 of Figure 3 and looking in the direction indicated by the arrows.
Figure 5 is a detail vertical sectional view of one suitable means for selectively rendering the brake means for the overrunning brake operative or inoperative, certain of the parts being shown in elevation.

In Figure 5, a cover 87 for protecting the brake operating means against dirt and damage is shown and the diaphragm valve housing is suitably secured thereto.

Also, as shown more clearly in Figures 3 and 4 an end plate cover 88 is secured to the housing 6 by the screws 90 for concealing the anchoring means for the brake members 69. This cover is removable for assembling the device and also provides access to the anchoring means for adjustment thereof.

A description of the operation of the transmission follows.

Assuming that the diaphragm valve is connected to vacuum, the actuating member 70 is moved to the left as viewed in the drawings, causing the bell crank to operate about its pivotal connection which draws the free end of the arcuate external brake band 69. Thus, the brake lining 68 engages the outer surface of the brake drum 62 and the overrunning or one-way brake means will be rendered operative.

Now, with the torque transmitting member shifted to the left, ratio or underdrive will be imparted to the driven shaft. With the torque member to the right, as viewed in the drawings, the drive and driven shafts will be coupled together for direct drive and the overrunning brake will overrun due to the arrangement of the cam surfaces 66 of the cam member 61. Assuming the drive shaft is rotating in a clockwise direction with the brake applied to the sheave, it will be seen that upon shifting of the torque transmitting member from direct drive to ratio drive, or vice versa, the overrunning brake will be locked up since the sun gear tends to rotate the planet carrier 18 in a counter-clockwise direction. Thus, it will be seen that under these conditions continuous torque will be applied to the driven shaft during the shifting operation.

If the brake means 67 is released and the torque transmitting member 40 is in neutral position, or if the latter is being shifted to effect a change in the drive ratio, torque will not be applied to the driven shaft.

As above noted, the present mechanism incorporates a neutral position which at the selection of the operator or suitable control mechanism, comprises a master control clutch, that is, with the torque transmitting member in neutral position and the brake means 67 released, no torque will be applied to the driven shaft.

It will further appear that, if desired, the drive shaft 12 may be rotated by means of suitable gearing mechanism (not shown) in a counter-clockwise direction in which event two reverse speeds may be imparted, selectively, to the driven shaft by shifting of the torque member 40. Under these circumstances, however, the brake means 67 for the overrunning brake must be released so that the overrunning brake is rendered inoperative. Under these conditions it will appear that shifting of the torque transmitting member to effect the change in gear ratio will interrupt the application of torque to the driven shaft.

The preferred operation of the transmission herein disclosed contemplates that the brake means 67 preferably be released and the torque transmitting member 40 disposed in neutral position upon starting of the prime mover to minimize the load on the drive shaft as well as provide a neutral position for the gear mechanism. Preferably, although not necessarily, I prefer to provide suitable mechanism whereby the torque transmitting member is initially shifted to the left to engage the friction surface 41 with the annular friction surface 46 of the rib 45 to impart initial ratio drive to the driven shaft, and subsequently connect vacuum to the vacuum mechanism to apply the brake means 67. In this arrangement the torque is progressively applied from the drive shaft to the driven shaft and the torque transmitting member is utilized as a means for preventing free wheeling through the gear mechanism after the brake means 67 is applied. The load thus imposed upon the torque transmitting means is negligible and need only be sufficient for the purpose above noted.

While I have shown what I consider to be the preferred embodiment of my invention, it will be understood that various rearrangements of the parts may be made without departing from the spirit and scope of my invention.

I claim:

1. In a transmission, the combination of a casing, an epicyclic mechanism having two speeds and a neutral position, said epicyclic mechanism comprising the combination of a driving sun gear, a ring gear, and a controllable pinion carrier having dual pinions meshing with said ring gear and said sun gear, a brake member fixed to the casing, a one-way brake associated with the pinion carrier, means for rendering said one-way brake operative and inoperative, selectively, and a torque transmitting member slidably associated with the pinion carrier to secure said pinion carrier to said ring gear or to said brake member, selectively.

2. In a transmission, the combination of a housing, a planetary gear system comprising a sun gear, a ring gear and a planet carrier having dual planet pinions meshing between said ring gear and said sun gear, a drive shaft for driving said sun gear, a driven shaft connected to said ring gear, a sleeve journalled about said drive shaft and connected to said planet carrier, a torque transmitting member keyed to said sleeve and slidable axially thereon for locking said planet carrier to said housing or for connecting said planet carrier to said ring gear, said torque member having a neutral position, a brake drum disposed coaxially of said sleeve, a one-way brake disposed between said sleeve and said brake drum, and second brake means for holding said brake drum against rotation or for releasing said brake drum for rotation to render said one-way brake operative or inoperative, selectively, said one-way brake being adapted to restrain said planet carrier against rotation when said torque transmitting member is disposed in neutral position and when said brake drum is held against rotation.

3. In a transmission, a planetary gear system comprising three elements, namely, a sun gear, a ring gear, and a planet carrier having pinions meshing with said sun gear and said ring gear, a drive shaft connected to one of the elements, a driven shaft connected to the second of said elements, torque transmitting means for connecting two of the elements of said planetary gear system together to effect a direct drive from said drive shaft to said driven shaft or for holding the third element of said planetary gear system against rotation to effect a ratio drive from said drive shaft to said driven shaft, said torque means having a neutral position, a one-way brake associated with the third element, and second brake means for said one-way brake operable to cause said one-way brake to restrain said third element against rotation with said torque member disposed in neutral position, said second brake means being releasable for freeing said third element for rotation.

4. In a transmission, the combination of a housing, a planetary gear system comprising a sun gear, a ring gear having an external conical friction surface, a planet carrier having dual planet pinions meshing between said ring gear and said sun gear, said housing having an annular friction surface extending in the same direction as the friction surface of said ring gear, an axially shiftable torque transmitting member having internal and external conical friction surfaces extending in substantially the same direction as the friction surfaces of said ring gear and said housing for selectively locking said carrier to said annular friction surface of said housing or for locking said carrier to said ring gear, selectively, said torque transmitting member having a neutral position, a drive shaft connected to said sun gear, a driven shaft connected to said ring gear, a one-way brake associated with said planet carrier, and second brake means associated with said one-way brake for rendering the latter operative or inoperative, selectively.

5. In combination, a drive shaft, a driven shaft, a planetary gear system comprising a sun gear and a ring gear disposed between said drive and driven shafts, the sun gear and the ring gear of said planetary gear system being connected to said drive and driven shafts, respectively, said planetary gear system having a carrier comprising dual planet pinions meshing with said sun gear and said ring gear, a torque transmitting means for connecting said planet carrier to said ring gear or for holding said planet carrier against rotation, selectively, said torque means having a neutral position, a one-way brake associated with said planet carrier and being arranged to permit rotation of said planet carrier and said ring gear in the same direction when they are coupled together by said torque transmitting means, said one-way brake being adapted to hold said planet carrier against rotation in a direction opposite the direction of rotation of said drive and driven shafts when said torque transmitting means is disposed in a neutral position.

6. The combination of claim 5 characterized by the provision of brake means associated with the one-way brake for rendering the latter operative or inoperative, selectively.

WILLIAM S. JAMES.